(12) United States Patent
Tinoco et al.

(10) Patent No.: US 9,232,558 B1
(45) Date of Patent: Jan. 5, 2016

(54) MULTI SECTOR ANTENNA AND MESH NETWORK SYSTEM

(75) Inventors: Eduardo Tinoco, Surprise, AZ (US); Terry McManus, Marietta, GA (US)

(73) Assignee: Google Inc., Mountain View, CA (US)

( * ) Notice: Subject to any disclaimer, the term of this patent is extended or adjusted under 35 U.S.C. 154(b) by 355 days.

(21) Appl. No.: 13/171,013

(22) Filed: Jun. 28, 2011

Related U.S. Application Data

(60) Provisional application No. 61/398,575, filed on Jun. 28, 2010.

(51) Int. Cl.
- H04W 88/02 (2009.01)
- H04W 4/02 (2009.01)
- H04W 88/06 (2009.01)

(52) U.S. Cl.
CPC ............... *H04W 88/02* (2013.01); *H04W 4/02* (2013.01)

(58) Field of Classification Search
CPC ........ H04W 88/02; H04W 4/02; H04W 88/06
USPC .............. 455/7, 13.1, 13.3, 16, 73, 84, 562.1, 455/575.1, 575.7, 90.3, 130, 269, 272, 275, 455/11.3, 131, 212, 211, 17–25; 375/211, 375/212
See application file for complete search history.

(56) References Cited

U.S. PATENT DOCUMENTS

| | | | |
|---|---|---|---|
| 4,446,407 A * | 5/1984 | Sperber .......................... | 318/282 |
| 6,408,164 B1 * | 6/2002 | Lazaris-Brunner et al. . | 455/12.1 |
| 6,556,836 B2 * | 4/2003 | Lovberg et al. ............... | 455/505 |
| 7,053,859 B2 * | 5/2006 | Jackson et al. ................ | 343/882 |
| 7,881,752 B1 * | 2/2011 | Johnson et al. ............ | 455/562.1 |
| 8,351,987 B2 * | 1/2013 | Boch .......................... | 455/562.1 |
| 2002/0165001 A1 * | 11/2002 | Phillips et al. ................ | 455/500 |
| 2003/0022694 A1 * | 1/2003 | Olsen et al. .................... | 455/562 |
| 2003/0054763 A1 * | 3/2003 | Judd et al. ........................ | 455/20 |
| 2003/0224801 A1 * | 12/2003 | Lovberg et al. ............... | 455/454 |
| 2004/0110469 A1 * | 6/2004 | Judd et al. ........................ | 455/15 |
| 2005/0009494 A1 * | 1/2005 | Sorrells et al. ................ | 455/313 |
| 2006/0264210 A1 * | 11/2006 | Lovberg et al. ............ | 455/422.1 |
| 2010/0029197 A1 * | 2/2010 | Judd et al. ..................... | 455/11.1 |
| 2010/0033390 A1 * | 2/2010 | Alamouti et al. ............. | 343/755 |
| 2010/0062734 A1 * | 3/2010 | Chan ......................... | 455/127.2 |
| 2012/0135724 A1 * | 5/2012 | Lewis et al. ................ | 455/422.1 |

* cited by examiner

*Primary Examiner* — Edward Urban
*Assistant Examiner* — Ralph H Justus
(74) *Attorney, Agent, or Firm* — Lerner, David, Littenberg, Krumholz & Mentlik, LLP

(57) ABSTRACT

A multi-sector antenna system is disclosed that includes two or more flat panel antennas facing different directions and configured to communicate with two separate sites using millimeter wave RF signals. A processing module is communicatively coupled to each of the flat panel antennas. In some embodiments, the processing module may be configured to receive incoming RF signals from a first site via a first flat panel antenna, convert the incoming RF signals to outgoing RF signals, and transmit the outgoing RF signals to a second site via the second flat panel antenna. The flat panel antennas may be configured to transmit and receive RF signals at frequencies in the range of about 57 GHz to 86 GHz. The multi-sector antenna system may be utilized in a mesh network system.

25 Claims, 12 Drawing Sheets

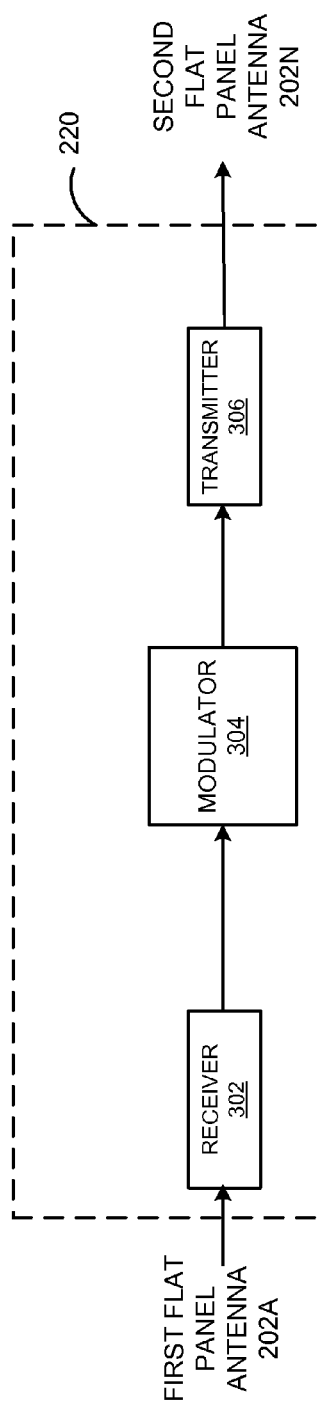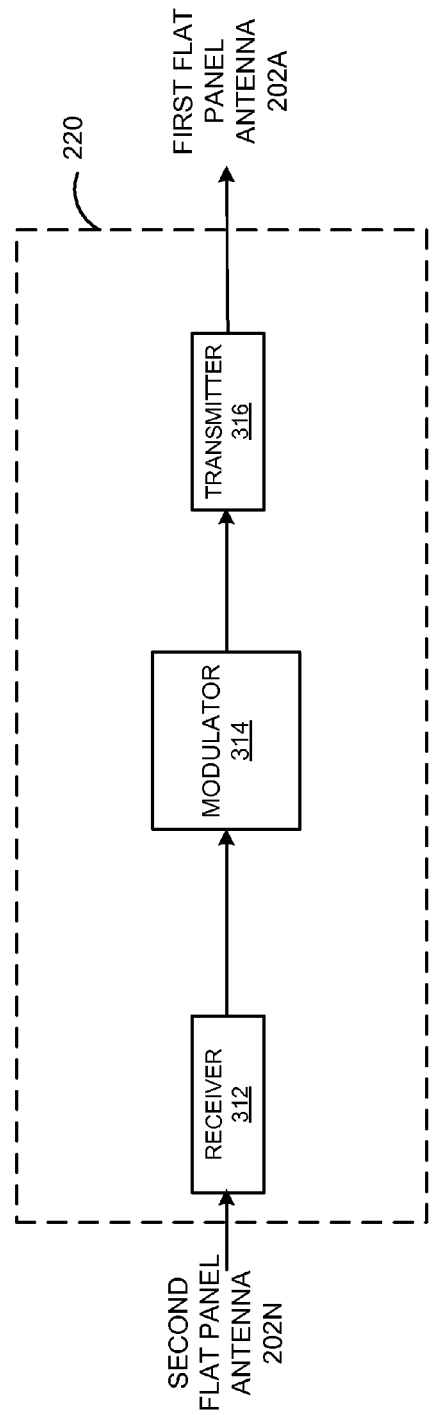

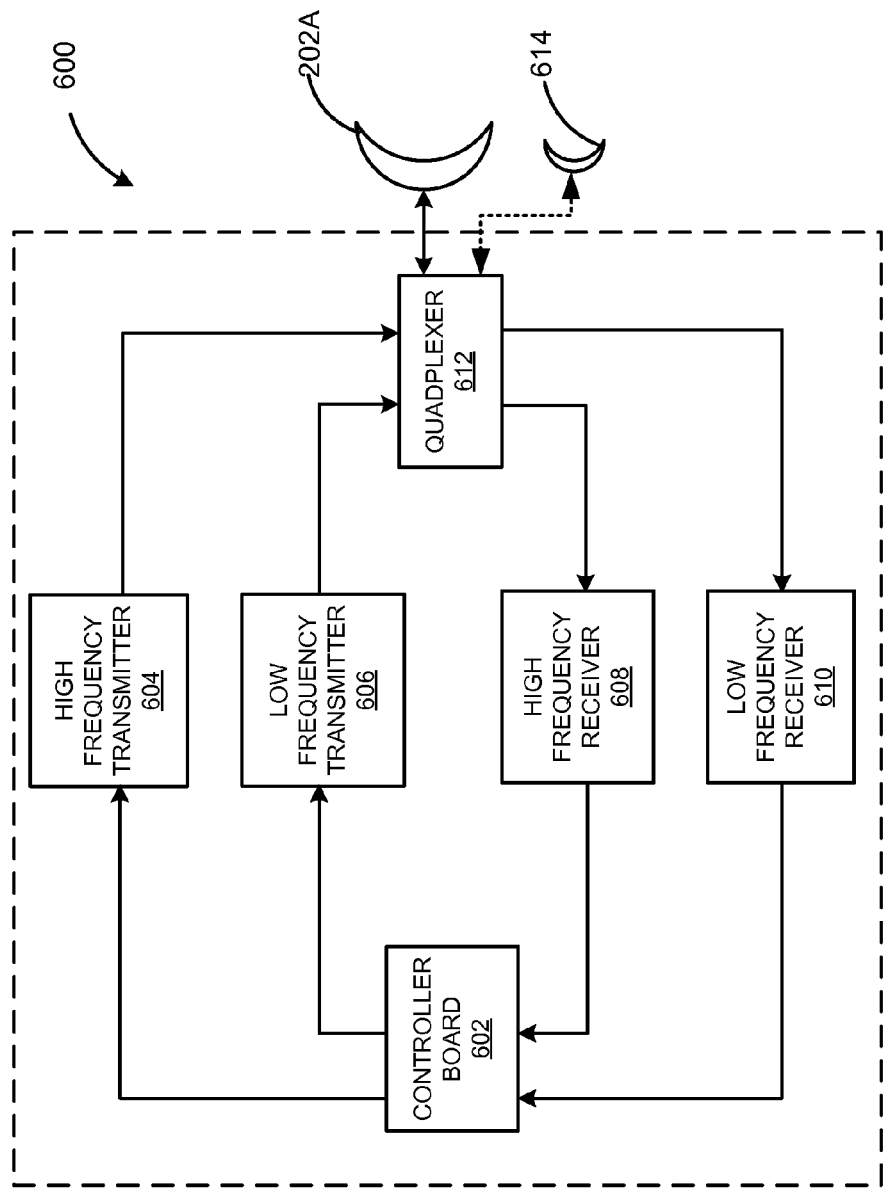

MULTI SECTOR ANTENNA AND MESH NETWORK SYSTEM

CROSS-REFERENCE TO RELATED APPLICATIONS

This application claims the benefit of provisional U.S. patent application No. 61/398,575, filed on Jun. 28, 2010, and entitled "Multi-Sector Antenna", which is expressly incorporated herein in its entirety.

BACKGROUND

With the increased popularity of mobile computing devices, there is an ever growing need for high capacity data throughput to wireless computing devices, such as hand held "smart" cellular telephones, wireless network adapters, and other types of wireless data devices. To meet this need, macrocell and picocell base stations are being widely installed. A picocell base station is typically a relatively low cost, small, reasonably simple unit that connects to a base station controller. A macrocell base station serves a larger geographic area than a picocell base station, but is much more expensive to install.

Because fiber optic cable is not always available, or may be cost prohibitive, telecommunications carriers are beginning to rely more greatly on wireless infrastructure to deploy backhaul data capacity to macrocell and picocell base stations. One challenge when deploying wireless backhaul is not having a clear line of sight from a macrocell or picocell base station to a backhaul end-location. Structures such as buildings, roads, vegetation and residential homes may prevent point-to-point wireless connections. Moreover, weather and other factors might greatly impact current wireless backhaul solutions.

It is with respect to these and other considerations that the disclosure made herein is presented.

SUMMARY

A multi-sector antenna and wireless mesh network system are provided herein for use in wireless backhaul installations. Through an implementation of the concepts and technologies presented herein, a millimeter wave multi-sector antenna system is provided for installation at a communications node, such as a macrocell or picocell base station. The multi-sector antenna is configured to establish wireless millimeter wave communication links with two or more nodes such that the multi-sector antenna system can link the multiple nodes. In one implementation, a millimeter-wave multi-sector antenna system is configured to simultaneously link one or more picocell base stations to a macrocell base station.

According to one implementation, the millimeter-wave multi-sector antenna disclosed herein is utilized in a hybrid communications network, such that a redundant, wireless, high capacity communications network may be established to meet the ever-growing need for high-capacity data throughput to wireless computing devices. As used herein, the term "millimeter wave" refers to the frequency range of the electromagnetic wave spectrum that encompasses millimeter waves. In some implementations, the frequency range may be from 57 GHz to 86 GHz.

According to one aspect, a multi-sector antenna system includes two or more flat panel antennas configured to receive incoming radio frequency ("RF") signals from two or more sites. A processing module that is communicatively coupled to the flat panel antennas converts incoming RF signals and passes the outgoing RF signals to one or more of the flat panel antennas. According to embodiments, the flat panel antennas may be millimeter wave flat panel antennas that are configured to transmit and receive RF signals at frequencies in the range of about 57 GHz to 86 GHz.

According to another aspect, a method of wirelessly transmitting data within a wireless communications system is described. According to the method, data is modulated on a first outgoing signal at a higher radio frequency. The same data is also modulated on a second outgoing signal at a lower RF frequency. If the first outgoing signal can be transmitted to a receiving antenna at a remote site, then the first outgoing signal is selected for transmission to the remote site. However, if the first outgoing signal cannot be transmitted to the remote site, such as for instance due to weather or other types of interference, then the second outgoing signal is selected for transmission to the remote site.

According to another aspect, a multi-gigabit port is provided that includes multiple independent full-duplex Gigabit ports that could be used for aggregation, re-routing and meshing data from one radio modem to another. Additionally, the extra gigabit ports can be use to interconnect the wireless radio to other wireless radios, fiber, copper cable or other multi-gigabit radio modems.

According to another aspect, a mesh network is provided that includes multiple millimeter wave base stations that are communicatively linked with one another, and multiple microwave base stations that are communicatively linked with one another. In the mesh network, an aggregate millimeter wave base station is communicatively linked to an aggregate microwave base station such that the multiple millimeter wave base stations are communicatively linked with the multiple microwave base stations. Through an implementation of the mesh network disclosed herein, a wireless network can be created that is highly redundant and within which the degree of redundancy can be scaled as needed.

It should be appreciated that the above-described subject matter may also be implemented in various other embodiments without departing from the spirit of the disclosure presented herein. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A is a schematic diagram illustrating the conversion of an incoming RF signal received from a first site to an outgoing RF signal for transmission to a second site, in accordance with some embodiments;

FIG. 3B is a schematic diagram illustrating the conversion of an incoming RF signal from a second site to an outgoing RF signal for transmission to a first site, in accordance with some embodiments;

FIG. 6 is a block diagram illustrating a radio system configured to transmit and receive millimeter wave RF signals and microwave RF signals, in accordance with some embodiments;

DETAILED DESCRIPTION

Figure 1:
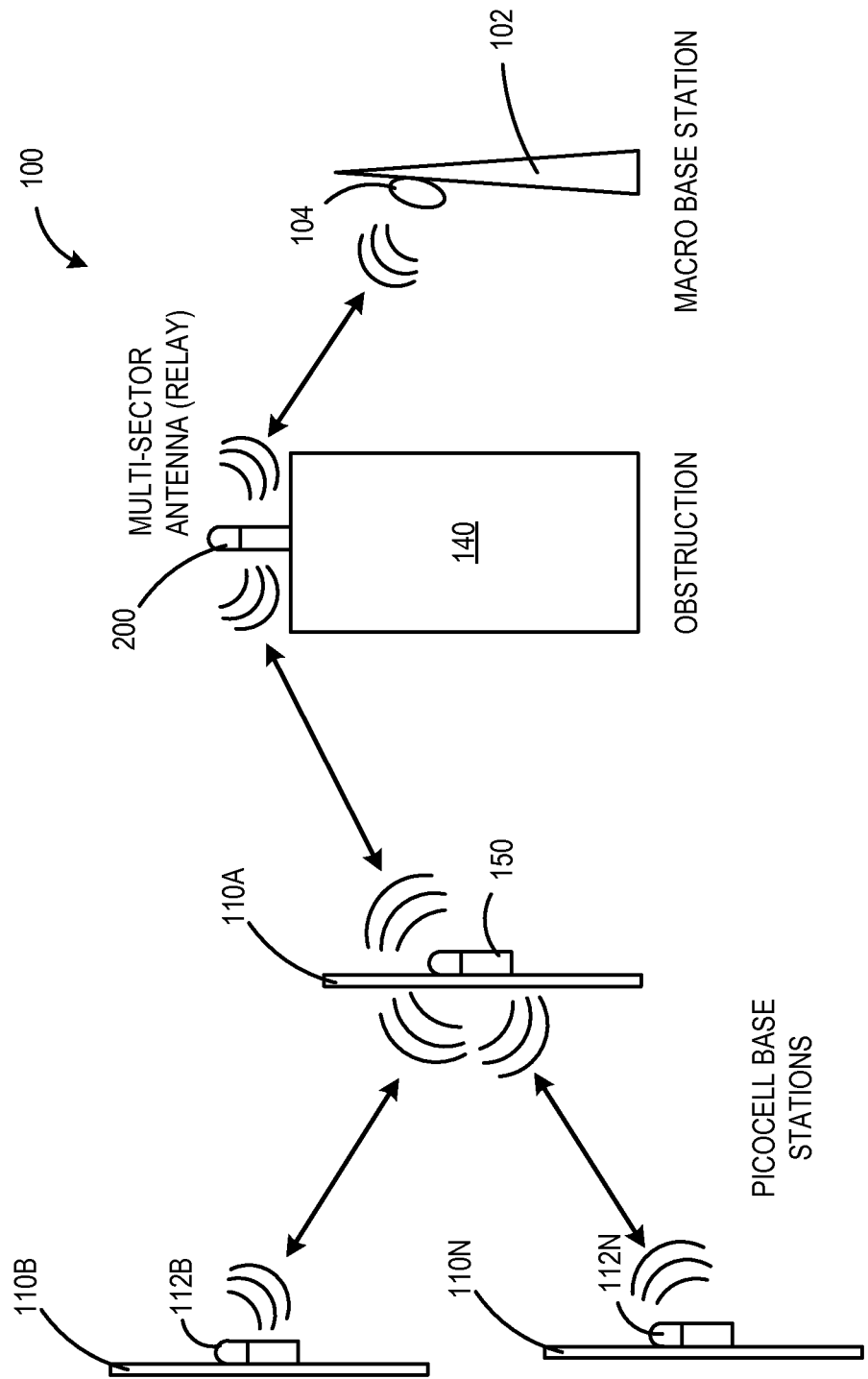
FIG. 1 is a network architecture diagram showing one illustrative operating embodiment for the embodiments disclosed herein.

The following detailed description is directed to technologies for providing a multi-sector antenna and wireless mesh network system for use in wireless backhaul installations. As discussed briefly above, a millimeter wave multi-sector antenna installed at a node, such as a macrocell or picocell base station, is configured to establish millimeter wave communication links with one or more other nodes such that the multi-sector antenna can establish communication links with multiple nodes simultaneously. Further, implementing the millimeter wave multi-sector antenna system in existing microwave communications systems may establish a redundant, wireless, high capacity communications network to meet the ever-growing need for high-capacity data throughput to computing devices.

In the following detailed description, references are made to the accompanying drawings that form a part hereof and that are shown by way of illustration, specific embodiments or examples. Referring now to the drawings, in which like numerals represent like elements through the several figures, technologies for providing a multi-sector antenna and a wireless mesh network system according to the various embodiments will be described.

FIG. 1 is a network architecture diagram showing one illustrative operating embodiment for the embodiments disclosed herein. The millimeter wave network communications environment 100 shows a macrocell base station 102 that may be configured to communicate with multiple picocell base stations, such as a first picocell base station 110A, a second picocell base station 110B, and a third picocell base station 110N, which are generally referred to as "picocell" base stations 110. Each picocell base station can contain several antennas and the system can aggregate, relay, and perform mesh-networking functions.

The macrocell base station 102 may include an antenna 104 configured to communicate indirectly with one or more antenna systems of the picocell base stations 110 using millimeter wave RF signals. According to some embodiments, the first picocell base station 110A provides aggregation functionality by aggregating data from the second picocell base station and the third picocell base station and providing the aggregated data to the macrocell base station 102. In such embodiments, the first picocell base station 110A may include an aggregate multi-sector antenna system 150, while the second picocell base station 110B and the third picocell base station 110N may include antennas 112B, 112N respectively.

Millimeter wave RF signals may generally have a frequency between 30 GHz and 300 GHz. However, according to some implementations, the millimeter wave RF signals are frequencies within the range of about 57 GHz to 86 GHz. Similarly, microwave RF signals may generally have a frequency between 1 GHz and 30 GHz. According to some implementations, the microwave RF signals are frequencies within the range of about 2.4 GHz to 23 GHz.

In the example shown in FIG. 1, the macrocell base station 102 is unable to communicate with any of the picocell base stations 110 directly. This is because of an obstruction 140 that blocks the line of sight between the antennas associated with the picocell base stations 110 and the antennas associated with the macrocell base station 102. In typical environments, an obstruction, such as a building, a bridge, a tree, or other structure may obstruct the line of sight and/or fiber/copper lines are not present between antennas. In order to enable communication despite the existing obstruction 140, a relay multi-sector antenna system 200 may be positioned at a location within the environment 100 such that the relay multi-sector antenna system 200 lies in the line of sight of the antenna 104 of the macrocell base station 102 and the aggregate multi-sector antenna system 150 of the first picocell base station 110. In this way, the relay multi-sector antenna system 200 may relay communications between the macrocell base station and the first picocell base station 110A.

According to an example implementation shown in FIG. 1, the first picocell base station 110A may include the aggregate multi-sector antenna system 150 that is configured to communicate with the antenna 112B at the second picocell base station 110B and the antenna 112N at the third picocell base station 110N. In addition, the aggregate multi-sector antenna system 150 of the first picocell base station 110A may also be configured to communicate with the relay multi-sector antenna system 200. In this way, the aggregate multi-sector antenna system 150 may be configured to backhaul data being received from multiple picocell base stations to the relay multi-sector antenna system 200 that is in communication with the macrocell base station 102. Additional details regarding the relay multi-sector antenna system 200 are presented below with respect to FIG. 2.

Figure 2:
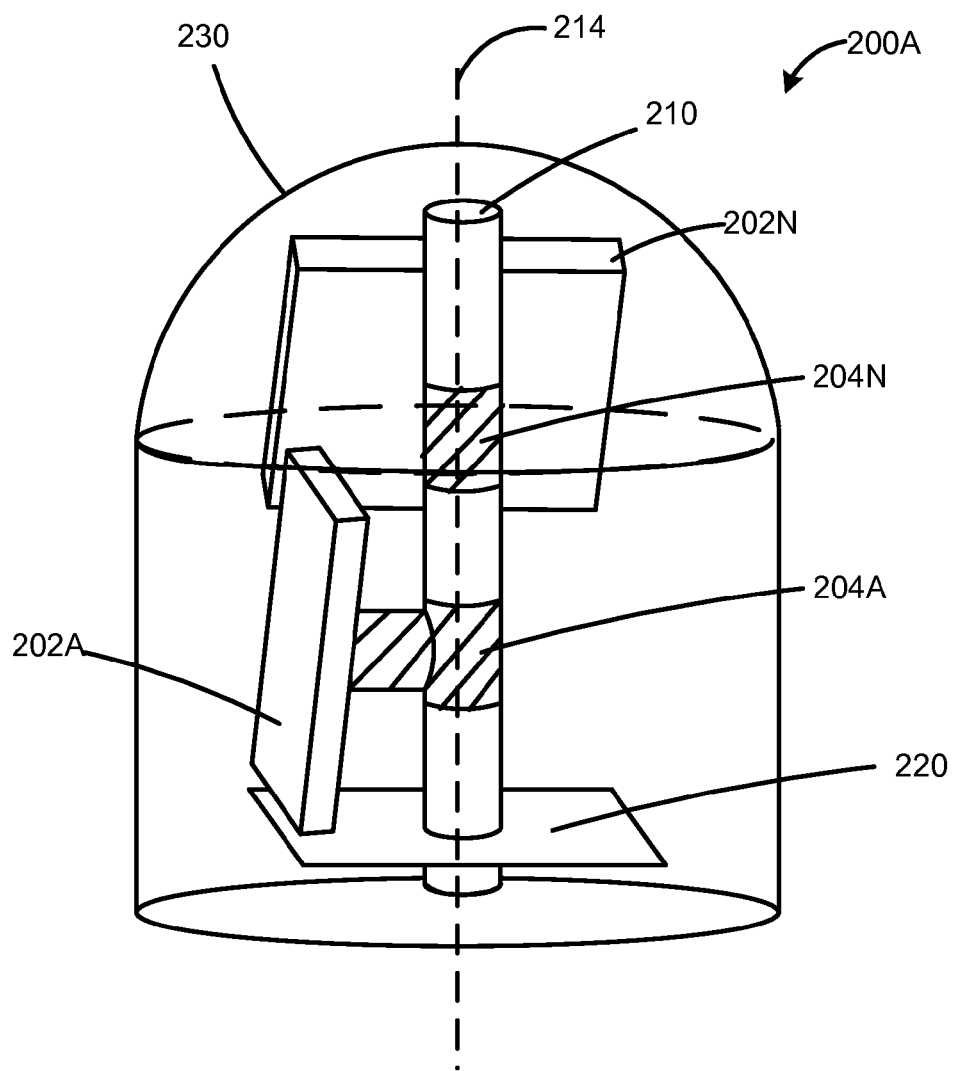
FIG. 2 is a perspective diagram showing one view of a millimeter wave multi-sector antenna system, according to one embodiment presented herein.

FIG. 2 is a perspective diagram showing one view of a millimeter-wave multi-sector antenna system, in accordance with some embodiments, such as the relay multi-sector antenna system 200. As described above, the relay multi-sector antenna system 200 may be configured to establish communications with the antenna 104 of the macrocell base station 102 and the aggregate multi-sector antenna system 150 of the first picocell base station 110A. In this way, the relay multi-sector antenna system 200 may enable communication between the macrocell base station 102 and the first picocell base station 110A. Further, as described above, the aggregate multi-sector antenna system 150 is configured to communicate with the second picocell base station 110B and the third picocell base station 110N. Consequently, both the second and third picocell base stations 110B, 110N are also indirectly communicating with the macrocell base station 102 via the relay multi-sector antenna system 200 and the aggregate multi-sector antenna system 150.

The relay multi-sector antenna system 200 may include a first flat panel antenna 202A and a second flat panel antenna 202N, which may generally be referred to herein as flat panel antennas 202. According to some embodiments, the flat panel antennas 202 may be any flat panel antenna capable of receiving and transmitting RF signals in the millimeter wave frequency range.

The first flat panel antenna 202A may be configured to face one of the antennas of the aggregate multi-sector antenna system 150 to enable communications between the relay multi-sector antenna system 200 and the first picocell base station 110A. The second flat panel antenna 202N may be configured to face the antenna 104 of the macrocell base station 102 to enable communications between the relay multi-sector antenna system 200 and the macrocell base station 102.

It should be appreciated that the relay multi-sector antenna system 200 may include more than two flat panel antennas 202. For instance, the aggregate multi-sector antenna system 150 may include three flat panel antennas, in which two of the flat panel antennas may face the second and third picocell base stations 110B, 110N, respectively, while the third flat panel antenna may face the first flat panel antenna 202A of the relay multi-sector antenna system 200.

In other implementations, the relay multi-sector antenna system 200 may include as many flat panel antennas as required. However, in some embodiments, the maximum number of flat panel antennas may be limited to four for various reasons, including capacity limitations of the backhaul RF signals, processing capabilities, power consumption constraints, and other factors.

The flat panel antennas 202 may be mounted on a mounting structure 210. According to embodiments, the first flat panel antenna 202A may be coupled to a first antenna direction control component 204A, which is configured to mount the first flat panel antenna 202A to the mounting structure 210. The second flat panel antenna 202B may be coupled to a second antenna direction control component 204B, which is configured to mount the second flat panel antenna 202B to the mounting structure 210. The first and second antenna direction control components 204A, 204B may generally be referred to herein as an antenna direction control component 204. The antenna direction control component 204 may be any component that is configured to mount a corresponding flat panel antenna 202 to the mounting structure 210.

In some implementations, the antenna direction control component 204 is configured to rotate a corresponding flat panel antenna 202 radially around a longitudinal axis 214 of the mounting structure 210 such that the flat panel antenna 202 can face any direction around the mounting structure 210. In addition, the flat panel antenna 202 may be configured to tilt about a horizontal axis (not shown) such that an angle of elevation of the flat panel antenna 202 is adjustable. According to some embodiments, the angle of elevation may vary up to 45 degrees on either side of the horizontal axis. Additional details regarding the antenna direction control component 204 are provided below with respect to FIG. 5.

In various embodiments, the flat panel antenna 202 may be mounted to the mounting structure 210 via a stationary antenna direction control component that is configured to keep the flat panel antenna 202 stationary. In such embodiments, if the flat panel antenna 202 needs to face another direction, a technician may be required to physically adjust the direction of the flat panel antenna 202.

The relay multi-sector antenna system 200 may also include a processing unit 220 that is communicatively coupled to each of the flat panel antennas 202. According to embodiments, the processing unit 220 and the flat panel antennas 202 may be communicatively linked through cables.

The processing unit 220 may include receivers and transmitters that correspond to each of the flat panel antennas 202 of the relay multi-sector antenna system 200. Moreover, the processing unit 220 may be configured to receive incoming RF signals from the first picocell base station 110A via the first flat panel antenna 202A, process the incoming RF signals and transmit outgoing RF signals to the macrocell base station 102, via the second flat panel antenna 202N. Similarly, the processing unit 220 may be configured to receive incoming RF signals from the macrocell base station 102 via the second flat panel antenna 202B, process the incoming RF signals, and transmit outgoing RF signals to the first picocell base station 110A via the first flat panel antenna 202A.

According to some embodiments, the processing unit 220 includes an antenna direction control module (not shown) that is configured to cause any of the antenna direction control components 204 to rotate the corresponding flat panel antennas 202 to face a particular direction. For instance, the antenna direction control module may send a control signal to the first antenna direction control component 204A instructing the antenna direction control component 204A to rotate the first flat panel antenna 202A such that the first flat panel antenna 202A is in the line of sight of the aggregate multi-sector antenna system 150 of the first picocell base station 110A.

According to embodiments, the flat panel antenna 202 is configured to produce a beam that has a half-power beam width of about 1-2 degrees. Consequently, antennas that are slightly misaligned may not be in the line of sight of one another. Accordingly, the antenna direction control module may be configured to cause the antenna direction control components 204 to accurately align the corresponding flat panel antennas 202 with antennas at other base stations.

According to some implementations, the processing unit 220 may be configured to determine the destination address of data contained in the incoming RF signals and provide the destination address to the antenna direction control module. When the processing unit 220 receives an incoming RF signal that includes the destination base station of the data contained in the incoming RF signal, the processing unit 220 may determine if any of the flat panel antennas 202 are facing the destination base station. If none of the flat panel antennas 202 are in the line of sight of the destination base station, the antenna direction control module may rotate an available flat panel antenna to face a particular direction such that the available flat panel antenna is in the line of sight of an antenna at the destination base station. An available flat panel antenna may be a flat panel antenna that is not being utilized to receive data from or transmit data to a remote site.

The relay multi-sector antenna system 200 may also include a housing 230 that is configured to contain all of the components of the relay multi-sector antenna system 200. According to embodiments, the housing 230 may be made of a material that does not interfere with the transmission and reception of RF signals.

FIG. 3A is a schematic diagram illustrating the conversion of an incoming RF signal received from a first site to an outgoing RF signal for transmission to a second site, in accordance with some embodiments. As described above with respect to FIG. 2, and using the relay multi-sector antenna system 200 as an example embodiment, the processing unit 220 may be configured to receive an incoming RF signal, convert the incoming RF signal to an outgoing RF signal, and transmit the outgoing RF signal.

According to embodiments, the first flat panel antenna 202A of the relay multi-sector antenna system 200 is configured to receive incoming RF signals from the first picocell base station 110A. The processing unit 220 may include a first receiver 302, a first modulator 304, and a first transmitter 306. The first receiver 302 may be configured to receive the incoming RF signals and convert them into electrical signals. The first modulator 304 may be coupled to the output of the first receiver 302 and configured to modulate the converted electrical signals that are output from the first receiver 302 on a baseband signal. The first transmitter 306 may be coupled to the output of the first modulator 304, and configured to convert the modulated baseband signal that is output from the first modulator 304 to an outgoing RF signal. The first transmitter 306 may generate RF signals that are millimeter wave frequencies. These millimeter wave frequencies, which are the outgoing RF signals, may then be transmitted to the macrocell base station 102 via the second flat panel antenna 202N.

FIG. 3B is a schematic diagram illustrating the conversion of an incoming RF signal from the second site to an outgoing RF signal for transmission to the first site, in accordance with some embodiments. As described above, FIG. 3A illustrates the process of converting incoming RF signals received from the first picocell base station 110A to outgoing RF signals and transmitting the outgoing RF signals to the macrocell base station 102. In contrast, FIG. 3B illustrates the process of converting incoming RF signals received from the macrocell base station 102 to outgoing RF signals and transmitting the outgoing RF signals to the first picocell base station 110A.

As shown in FIG. 3B, the processing unit 220 may also include a second receiver 312, a second modulator 314, and a second transmitter 316. The second receiver 312 may be configured to receive the incoming RF signals sent from the macrocell base station 102 via the second flat panel antenna 202N and convert them into electrical signals. The second modulator 314 may be coupled to the output of the second receiver 312 and configured to modulate the converted electrical signals that are output from the second receiver 312 on a second baseband signal.

The second transmitter 316 may be coupled to the output of the second modulator 314, and configured to convert the signal that is output from the second modulator 314 to an outgoing RF signal. The second transmitter 316 may generate RF signals in the millimeter wave frequency range. These RF signals may then be transmitted to the first picocell base station 110A via the first flat panel antenna 202A.

It should be appreciated that FIGS. 3A and 3B illustrate functionality associated with the relay multi-sector antenna system 200. The relay multi-sector antenna system 200 provides relaying functionality but no aggregation functionality. However, the aggregation multi-sector antenna system 150 provides both relay and aggregation functionality. Accordingly, the processing unit of the aggregation multi-sector antenna system 150 includes additional components that enable the aggregation multi-sector antenna system 150 to provide functionality for aggregating data from multiple picocell base stations and distributing data to the multiple picocell base stations. Additional details regarding the processing unit of the aggregate relay multi-sector antenna system 150 are presented below with respect to FIGS. 4A and 4B.

As described above with respect to FIG. 1, the first picocell base station 110A utilizes the aggregate multi-sector antenna system 150 for aggregating data from the second and third picocell base stations 110B, 110N and communicating with the macrocell base station 102 via the relay multi-sector antenna system 200. According to some embodiments, the aggregate multi-sector antenna system 150 includes a first flat panel antenna configured communicate with the antenna 112A of the second picocell base station 110B and a second flat panel antenna configured to communicate with the antenna 112N of the third picocell base station 110N. In addition, the aggregate multi-sector antenna system 150 may include a third flat panel antenna configured to communicate with the first flat panel antenna 202A of the relay multi-sector antenna system 200.

Figure 4A:
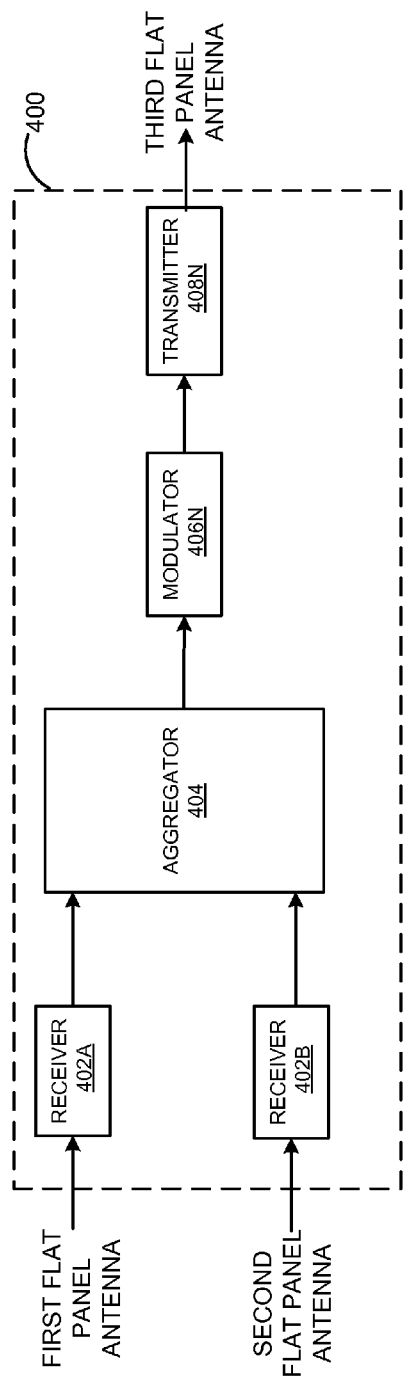
FIG. 4A is a schematic diagram illustrating the conversion of incoming RF signals received from multiple antennas to an outgoing RF signal, in accordance with some embodiments.

FIG. 4A is a schematic diagram illustrating the conversion of incoming RF signals received from multiple antennas to an outgoing RF signal, in accordance with some embodiments. In this example, the first picocell base station 110A may be configured to receive incoming RF signals from the second picocell base station 110B and the third picocell base station 110N, aggregate data contained in these incoming RF signals with data received at the first picocell base station 110A, modulate the aggregated data on a baseband signal, and transmit the modulated baseband signal to the macrocell base station 102 via the relay multi-sector antenna system 200.

To perform the functionality described herein, the aggregate multi-sector antenna system 150 may include a processing unit 400. Similar to the processing unit 220 of the relay multi-sector antenna system 200, the processing unit 400 may include separate receivers and transmitters for each antenna of the aggregate multi-sector antenna system 150. In the implementation shown in FIG. 1, the processing unit 400 may include a first, second and third receiver 402A, 402B, 402N and a first, second and third transmitter 408A, 408B, 408N corresponding to a first, second and third flat panel antenna of the aggregate multi-sector antenna system 150.

The processing unit 400 may include a first receiver 402A that may be configured to receive a first incoming RF signal from the second picocell base station 110B via the first flat panel antenna of the aggregate multi-sector antenna system 150 and convert the first incoming RF signal to a first electrical signal. Similarly, the processing unit 400 may include a second receiver 402B that may be configured to receive a second incoming RF signal from the third picocell base station 110N via the second flat panel antenna of the aggregate multi-sector antenna system 150 and convert the second incoming RF signal to a second electrical signal.

The first electrical signal and the second electrical signal are then aggregated by an aggregator 404. The aggregated signals are then modulated onto a baseband signal via a modulator 406. The processing unit 400 may also include a third transmitter 408N that is configured to convert the modulated baseband signal output from the modulator 406 to an outgoing RF signal. The third transmitter 408N may further be configured to transmit the outgoing RF signal to the relay multi-sector antenna system 200 via the third flat panel antenna of the aggregate multi-sector antenna system 150.

Figure 4B:
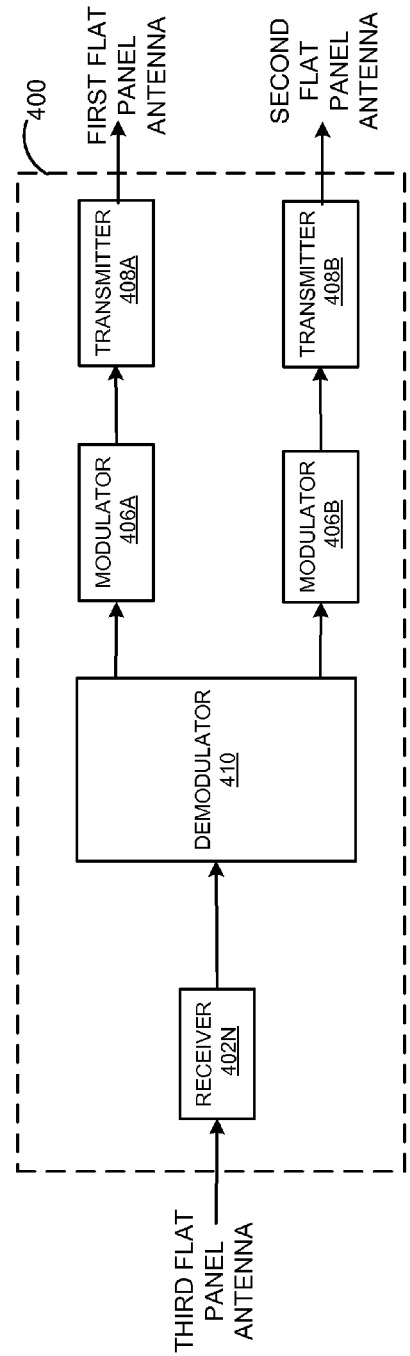
FIG. 4B is a schematic diagram illustrating the conversion of an incoming RF signal to multiple outgoing RF signals, in accordance with some embodiments.

FIG. 4B is a schematic diagram illustrating the conversion of an incoming RF signal received from a macrocell base station to multiple outgoing RF signals destined for multiple picocell base stations, in accordance with some embodiments. Following the example implementation described in FIG. 4A, the aggregate multi-sector antenna system 150 may be configured to receive an incoming RF signal from the relay multi-sector antenna system 200 via the third flat panel antenna. According to embodiments, the incoming RF signal may contain data corresponding to the first picocell base station 110A, the second picocell base station 110B and/or the third picocell base station 110N.

According to embodiments, the processing unit 400 may also include a third receiver 402N that is configured to receive an incoming RF signal from the third flat panel antenna 202N and convert the incoming RF signal to an electrical signal. The converted electrical signal may then be passed through a demodulator 410 that is configured to separate data contained in the electrical signal corresponding to the incoming RF signal into separate signals corresponding to each of the picocell base stations 110.

From the demodulator 410, each of the separate demodulated signals is passed through a corresponding modulator. For instance, in the implementation described herein, a first demodulated signal corresponding to the second picocell base station 110B that is output from the demodulator 410 is provided to a first modulator 406A that modulates the first demodulated signal on a baseband signal. Similarly, a second demodulated signal corresponding to the third picocell base station 110N that is output from the demodulator 410 is provided to a second modulator 406B that modulates the second demodulated signal on a corresponding baseband signal.

The modulated baseband signal containing the data destined for the second picocell base station 110B is then converted to a second outgoing RF signal and transmitted towards the second picocell base station 110B by a transmitter 408A. Likewise, the modulated baseband signal containing the data destined for the third picocell base station 110N may be converted to a third outgoing RF signal and transmitted towards the third picocell base station 110N by the transmitter 408B.

It should be appreciated that a corresponding receiver and transmitter associated with a particular flat panel antenna may be a transceiver configured to receive and transmit RF signals. Moreover, the processing units 220, 400 may include more components that may provide enhanced functionality.

Figure 5:
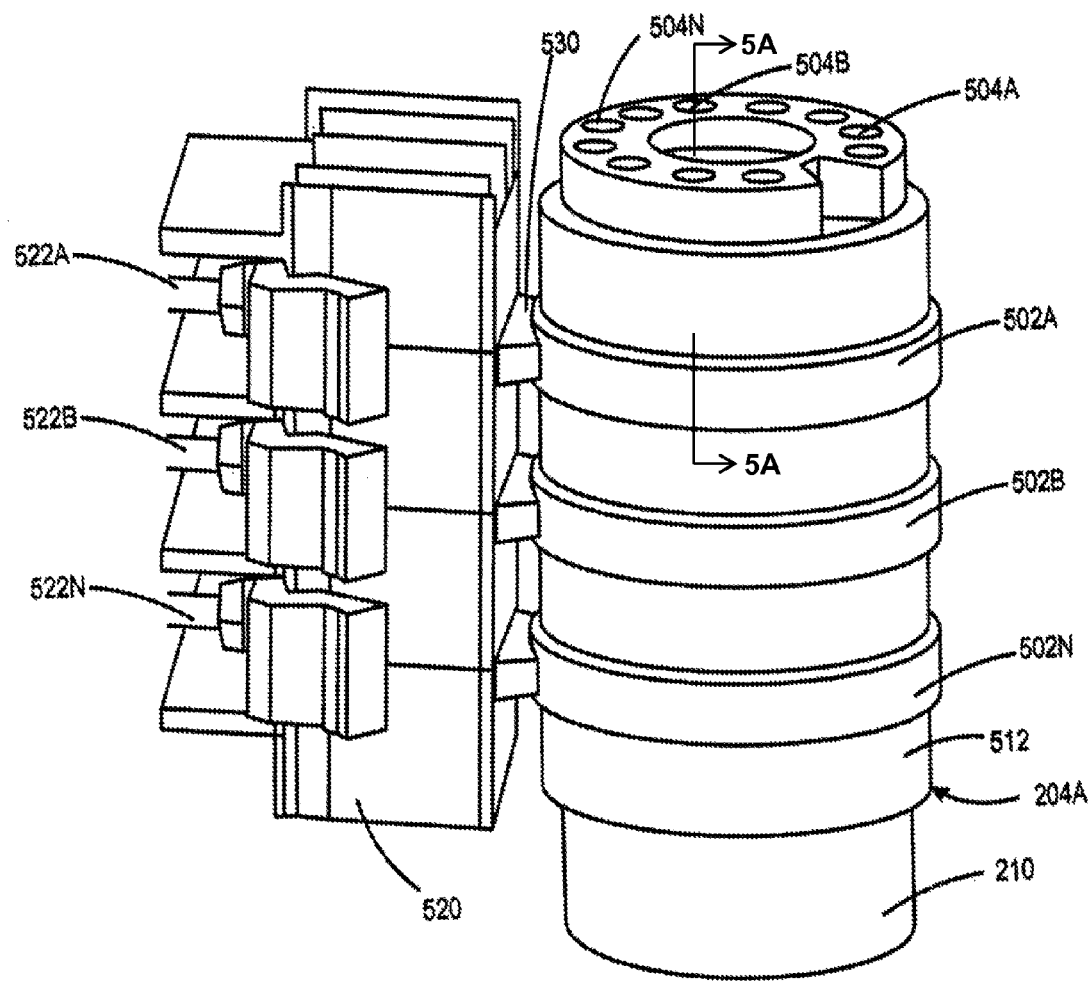
FIG. 5 is a perspective diagram showing one view of an antenna direction control component of the millimeter wave multi-sector antenna system shown in FIG. 2, in accordance with some embodiments.

FIG. 5 is a perspective diagram showing one view of an antenna direction control component of the multi-sector antenna system shown in FIG. 2, in accordance with some embodiments. The antenna direction control component 204A may be configured to rotate the flat panel antenna 202A coupled to the antenna direction control component 204A such that the flat panel antenna 202A may face any direction around the cylindrical mounting structure 210. According to some embodiments, the antenna direction control component 204A may include a rotatable mounting member 512 configured to mount concentrically around the outer surface of the cylindrical mounting structure 210 and a stationary antenna mounting member 520 that may be coupled to the rotatable mounting member 512.

The stationary antenna mounting member 520 may be physically coupled to the flat panel antenna 202A. Further, the stationary antenna mounting member 520 may include one or more terminals 522A, 522B, 522N to provide electrical connections for communicating with the flat panel antenna 202A. As described above, the stationary antenna mounting member 520 may be coupled to the rotatable mounting member 512 such that when the rotatable mounting member 512 rotates around the mounting structure 210, the flat panel antenna 202 coupled to the stationary antenna mounting member 520 may rotate around the mounting structure 210. In this manner, the rotatable mounting member 512 may cause the flat panel antenna 202 to face any direction around the mounting structure 210.

According to some implementations, the mounting member 512 may be configured to rotate around the mounting structure 210 via an actuation assembly (not shown) coupled to the mounting member 512. According to various embodiments, the actuation assembly may receive a control signal from the antenna direction control module of the processing unit 220. The control signal may cause the actuation assembly to rotate the mounting member 512 around the mounting structure 210 so as to cause the flat panel antenna 202A to face a direction that corresponds to the control signal.

The mounting member 512 may include one or more electrical connection bands 502A, 502B, 502N that may be communicatively coupled to the terminals 522A, 522B, 522N respectively. The electrical connection bands 502A, 502B, 502N may generally be referred to as electrical connection bands 502. In some implementations, each electrical connection band 502 may be coupled to a corresponding terminal 522 via a coupler 530. In one embodiment, the coupler 530 may couple the stationary antenna mounting member 520 to the rotatable mounting member 512 such that the stationary antenna mounting member 520 rotates with the rotatable mounting member 512.

Further, the electrical connection bands 502 are electrically coupled with the processing unit 220 via cables 514 (see FIG. 5A) that may be configured to pass through cable pathways 504A-504N, which may be generally referred to herein as cable pathways 504. According to embodiments, the cable pathways 504 may extend through the length of the mounting structure 210 and may be configured to receive a cable 514 that couples the processing unit 220 to the corresponding electrical connection band 502.

Figure 5A:
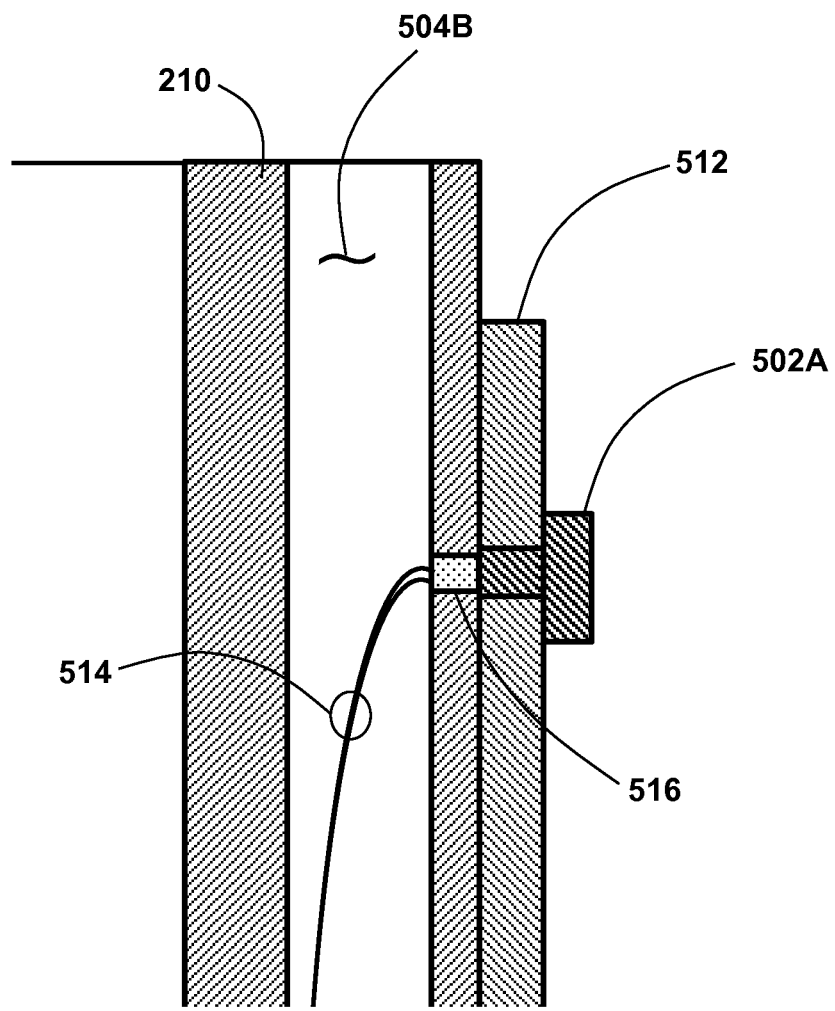
FIG. 5A is a cross-sectional view taken along line 5A-5A in FIG. 5.

According to embodiments, and as shown in FIG. 5A, the cable 514 may be coupled to an electrical contact component 516 that is a part of the antenna direction control component 204A. The electrical contact component 516 may be a carbon brush or any other conducting component that is configured to remain in contact with the electrical connection bands 502 while the electrical connection band 502 rotates relative to the electrical contact component 516. Since cables 514 are not in contact with any component that rotates, cables 514 also do not rotate. In this way, the flat panel antennas 202 may rotate around the mounting structure 210 without twisting or tangling cables 514.

It should be appreciated that in millimeter wave communication systems, the amount of data being transferred wirelessly between the macrocell base station 102 and the picocell base stations 110 may be much greater than 100 Mbps. By utilizing millimeter waves in the frequency range of 30 GHz to 300 GHz, the amount of data that can be backhauled between the macrocell base station 102 and the picocell base stations 110 may be about 1 Gbps, which is much larger than the amount of data that may be backhauled using microwaves in the frequency range of 2.4 GHz to 23 GHz. In order to backhaul data at speeds close to 1 Gbps, the antennas at the macrocell base station 102 and the picocell base stations 110 may be configured to transmit and receive millimeter wave frequencies.

It should be appreciated that the range of millimeter waves is typically shorter than the range of microwaves, and therefore, base stations may need to be located closer to one another than in communication networks that employ microwaves for data transmission. In addition, millimeter waves are more sensitive to weather and other environmental conditions than microwaves. As a result, when designing a communications network that utilizes millimeter waves for data transmission, a backup communications network involving microwaves may be utilized to provide redundancy in the event of adverse weather or other environmental conditions that may adversely affect the functioning of the millimeter wave communications network.

FIG. 6 is a block diagram illustrating a radio system configured to transmit and receive millimeter wave RF signals and microwave RF signals, according to some embodiments described herein. In particular, FIG. 6 illustrates a radio system 600 that includes a controller board 602, a high frequency transmitter 604, a low frequency transmitter 606, a high frequency receiver 608, a low frequency receiver 610, and a quadplexer 612.

The quadplexer 612 may be configured to discriminate over four separate wave types, including an outgoing higher frequency millimeter wave, an outgoing lower frequency microwave, an incoming higher frequency millimeter wave, and an incoming lower frequency microwave. In some implementations, quadplexer 612 may be coupled to the millimeter wave flat panel antenna 202 and a microwave antenna 614. According to embodiments, the millimeter wave flat panel antenna 202 may be coupled to the quadplexer 612 via a waveguide interface for millimeter wave RF signals, while the microwave antenna 614 may be coupled to the quadplexer 612 via a waveguide or coax cable. According to some embodiments, the quadplexer 612 may alternately be coupled to a single antenna that has a dual frequency interface for millimeter wave RF signals and microwave RF signals.

According to embodiments, the controller board 602 may be configured to continuously monitor the characteristics of incoming RF signals at the high frequency receiver 608 and the low frequency receiver 610. The controller board 602 then determines if the signal received by the high frequency receiver 608 has a signal to noise ratio (SNR) that is less than a threshold of the high frequency receiver 608. If the controller board 602 determines that the SNR is less than the threshold of the high frequency receiver 608, the controller board 602 may be configured to cause the quadplexer 612 to select the microwave RF signals for transmission via the low frequency transmitter 606. For example, low frequency transmitter 606 may operate at a data transmittal rate of less than 155 million bits per second and is configured to continue transmittal of information between first and second sites in the event of abnormal weather conditions.

However, if the controller board 602 determines that the SNR is not less than the threshold of the high frequency receiver 608, the controller board 602 may be configured to quadplexer 612 to select the millimeter wave RF signals for transmission via the high frequency transmitter 604. For example, high frequency transmitter 604 may operate at a data transmittal rate of at least 1 billion bits per second. In some implementations, the controller board 602 may determine the signal to noise ratio by measuring the bit errorrate (BER) of links.

The relay multi-sector antenna system 200 described in FIGS. 1-3 may be configured to incorporate the radio system 600 presented in FIG. 6 for use in a mesh communications network that utilizes both microwave and millimeter wave communications. As described above, millimeter wave data transmission may be utilized to transmit at a higher data rate as compared to microwave communications. However, millimeter wave communications cannot be transmitted over large distances and are more sensitive to environmental and weather conditions than microwave communications. A mesh network disclosed here that includes both millimeter wave communications and microwave communications may transmit data using millimeter waves most of the time, but may transmit data using microwaves when millimeter wave communications are unavailable, such as during adverse weather conditions. An example mesh network that utilizes both millimeter wave communications and microwave communications is described below with respect to FIG. 7.

Figure 7:
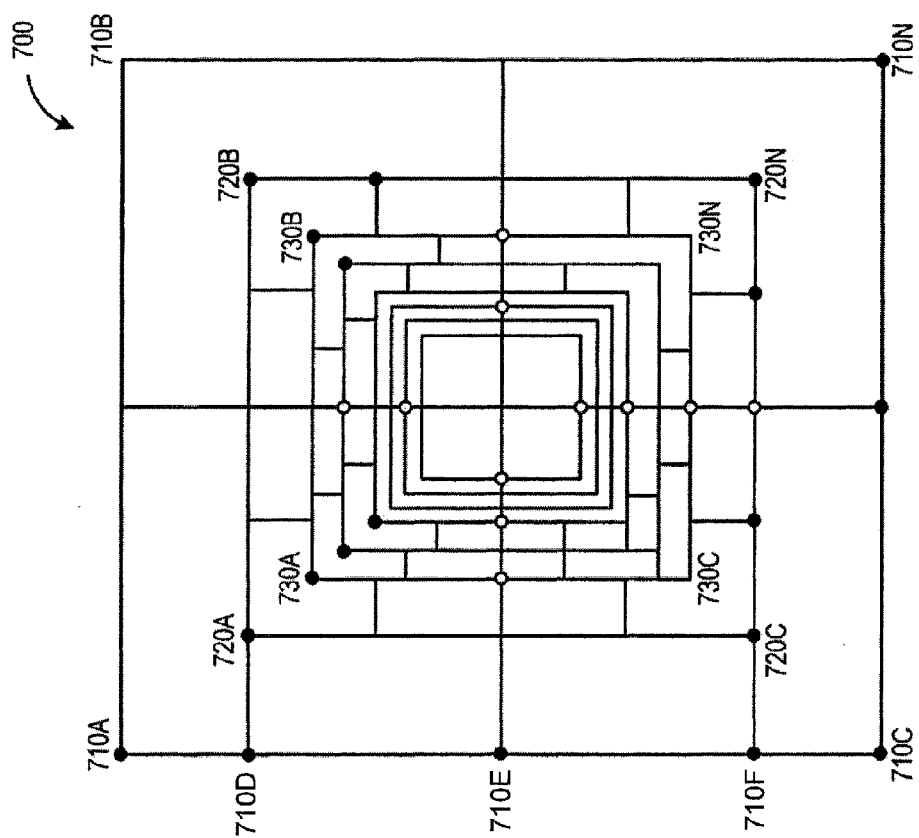
FIG. 7 is a diagram illustrating a mesh network utilizing millimeter wave and/or microwave RF signals, and/or fiber optic cable and/or copper cable, in an integrated network environment, in accordance with some embodiments.

FIG. 7 is a schematic diagram illustrating a mesh network utilizing millimeter wave and microwaves in an integrated network environment, in accordance with some embodiments. The mesh network 700 includes nodes that represent base stations, such as the macrocell base station 102 and the picocell base stations 110. Examples of the nodes include a point of presence (POP), a collocation, a building rooftop, and any other network component that is part of the network.

According to embodiments, the mesh network 700 may be based on a ring topology, such that nodes 710A-710N located in the outer most ring are a part of a ring network, while the nodes 720A-720N located in the second outer most ring are a part of a separate ring network. Links between adjacent nodes in each ring network are established by configuring the antennas of the adjacent nodes such that the antennas are facing one another. Nodes 720A-720N and nodes 730A-730N represent nodes in the third outer most ring.

In addition to the links that connect the nodes with other nodes in a particular ring, one or more linking nodes in each ring may be configured to establish links with nodes in adjacent rings. These linking nodes interconnect the rings with each other. Examples of these nodes include node 710D, node 720A, node 710E, node 710F and node 720C amongst others. It should be appreciated that unlike some of the nodes in the ring, linking nodes that interconnect the rings with each other may be configured to aggregate data from a set of nodes and pass the data onto another such linking node. Accordingly, an example of a linking node is the first picocell base station 110A.

According to embodiments, each node may include a carrier class Ethernet switch or a Resilient Packet Ring (RPR) switch that may be a part of the network equipment. Each ring may form a complete physical loop, such that all the nodes in a particular ring are communicatively linked with one another. However, whether or not the nodes in a particular ring form a complete logical loop is dependent on the network topology utilized.

As described above, millimeter waves are generally more prone to disruption than microwaves. In particular, antennas may not be able to communicate via millimeter waves during adverse weather conditions. Accordingly, it may be desirable to have a redundant backup communications network that may continue to function without disruptions even during adverse weather conditions. The redundant backup communications network may include nodes that communicate with other nodes using microwaves. According to embodiments, the degree of redundancy can be scaled as needed.

Figure 8:
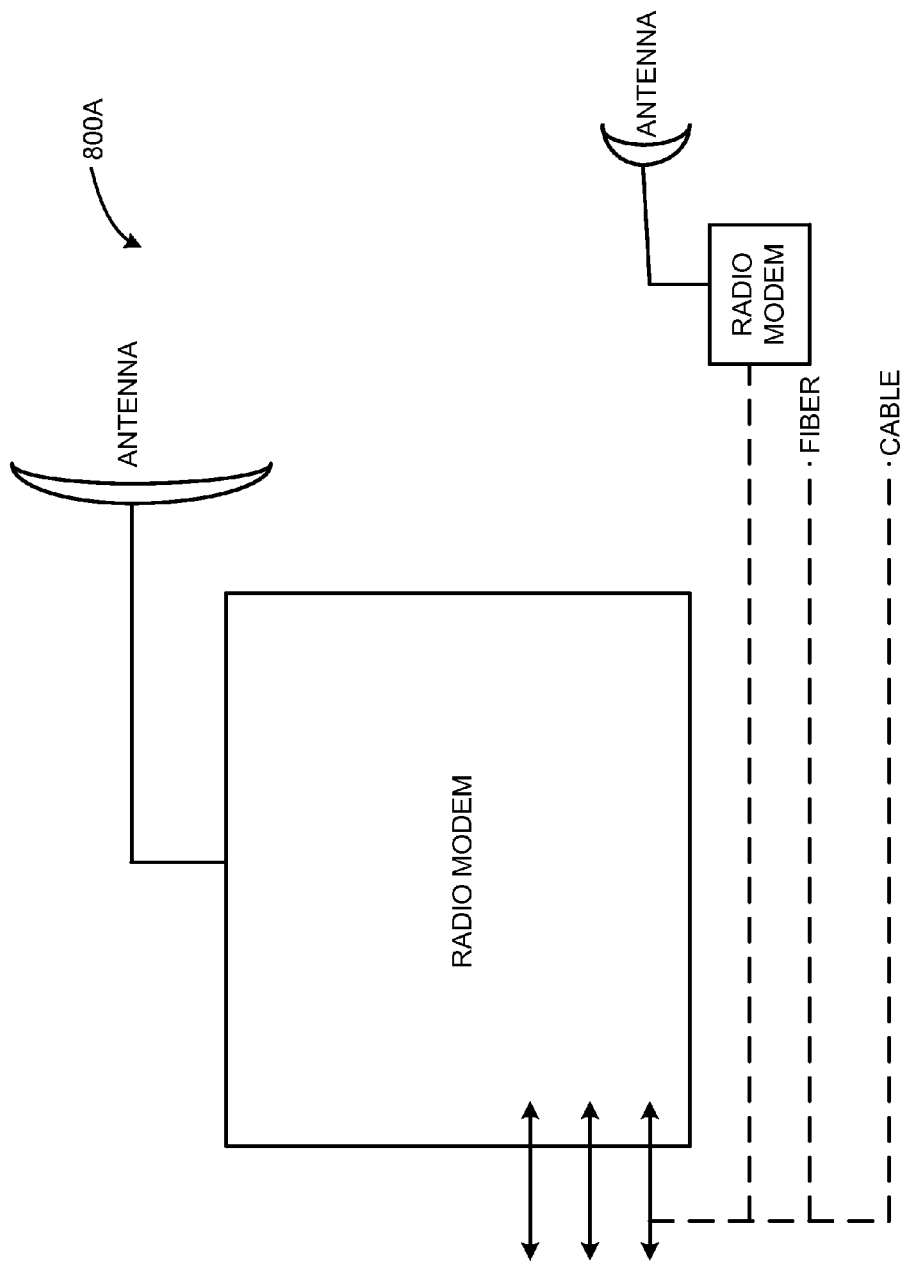
FIGS. 8 and 9 are schematic diagrams showing aspects of a multi-gigabit port radio modem that could be utilized to implement aspects of the mesh network illustrated in FIG. 7, in accordance with some embodiments.
Figure 9:
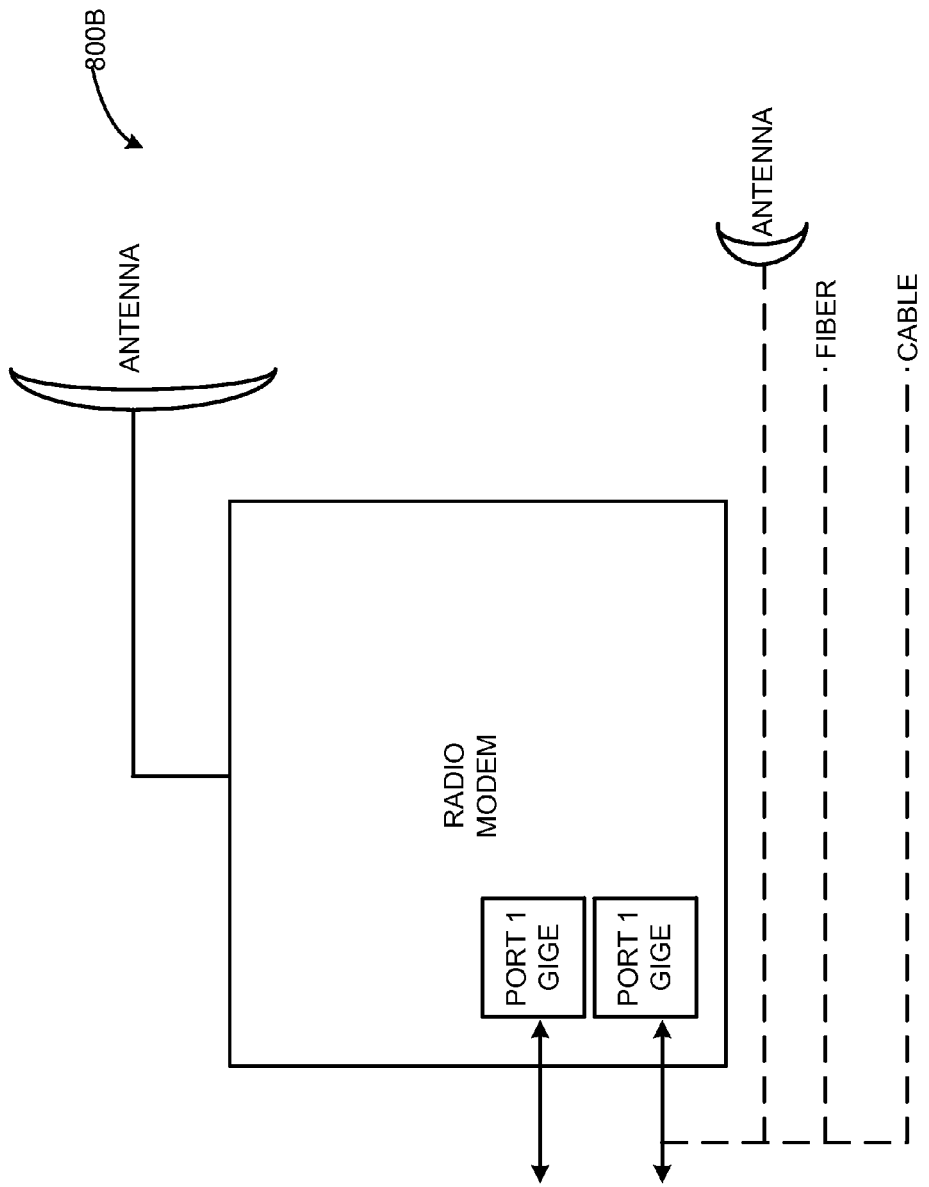

FIGS. 8 and 9 are schematic diagrams showing aspects of several multi-gigabit port radio modems 800A-800B that could be utilized to implement aspects of the mesh network illustrated in FIG. 7, in accordance with some embodiments. In particular, the multi-gigabit port radios 800A-800B shown in FIGS. 8 and 9 will allow for re-routing from one radio modem to another, to route data to fiber optic cable, traditional copper lines and/or lower frequency radio system.

According to embodiments, a controller board (not shown) might be configured to control the radio modems 800A-800B shown in FIGS. 8 and 9. The controller board may be configured to continuously monitor the characteristics of incoming RF signals at a high frequency receiver and data from one or more other high frequency receiver ports of the radio modem.

The controller board then determines if the signal received by the high frequency receiver has a signal to noise ratio ("SNR") that is less than a threshold of the high frequency receiver.

If the controller board determines that the determined SNR is less than the threshold of the high frequency receiver ports, the controller board may be configured to cause the radio modem 800 to select microwave RF signals for transmission via another port. If, however, the controller board determines that the SNR is not less than the threshold of the high frequency receiver ports, the controller board may be configured to select millimeter wave RF signals for transmission via a high frequency transmitter. In some implementations, the controller board ports may determine the signal to noise ratio by measuring the bit error rate (BER) of links.

Figure 10:
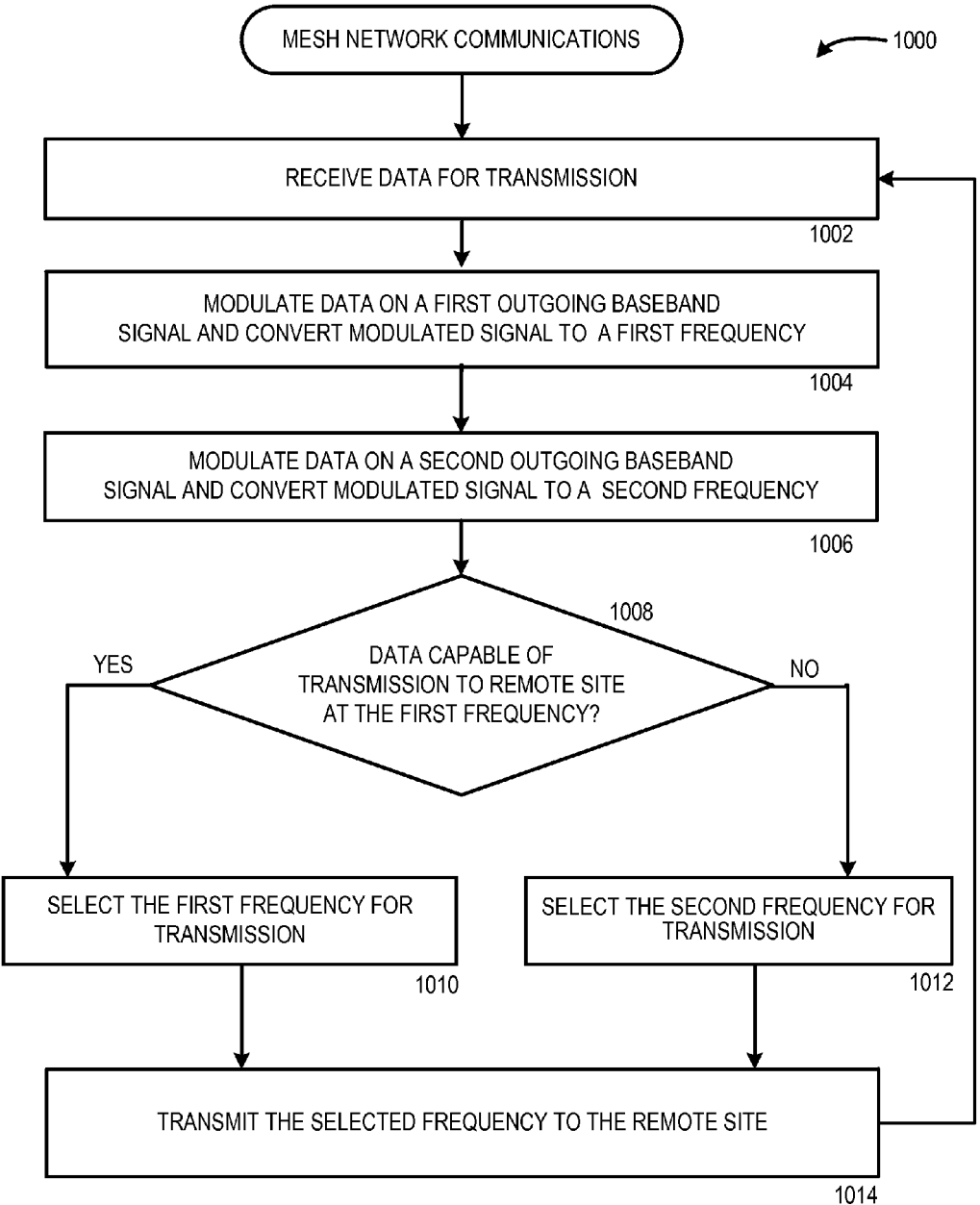
FIG. 10 is a logical flow diagram showing aspects of one illustrative process disclosed herein for wirelessly transmitting data within the mesh network shown in FIG. 7, in accordance with some embodiments.

FIG. 10 is a logical flow diagram illustrating a process of data transmission in a mesh network such as the mesh network shown in FIG. 7 and described above, according to some embodiments. It should be appreciated that the logical operations described herein may be performed by specifically programmed computing devices and/or analog or digital circuitry depending on the implementation. It should also be appreciated that more or fewer operations may be performed than shown in the figures and described herein. These operations may also be performed in a different order than those described herein.

A routine 1000 for wirelessly transmitting data in a mesh network begins at operation 1002, where data is received by the radio system, such as one of the radio systems 600, 700, or 800 for transmission. The data may be received from various devices communicating with the particular base station or via other base stations that are relaying data through the base station. From operation 1002, the routine 1000 proceeds to operation 1004, where the data is modulated on a first outgoing baseband signal and converted to a higher frequency RF signal.

From operation 1004, the routine 1000 proceeds to operation 1006, where the data is also modulated on a second outgoing baseband signal and converted to a second lower frequency RF signal. According to embodiments, the first higher frequency RF signal is a millimeter wave frequency while the second lower frequency RF signal is a microwave frequency.

From operation 1006, the routine 1000 proceeds to operation 1008, where the controller board 602 determines if the data is to be transmitted at a higher frequency, lower frequency, copper line cabling and/or fiber optic cable. This determination may be made by monitoring the communications network to see if conditions allow for data to be communicated via millimeter waves. If at operation 1008, the controller board 602 determines that the data is capable of being transmitted to the receiving antenna at the remote site using the higher frequency millimeter waves, the routine 1000 proceeds to operation 1010, where the first higher frequency RF signal is selected for transmission.

However, if at operation 1008, the controller board 602 determines that the data is not capable of being transmitted to the receiving antenna at the remote site using the higher frequency millimeter waves, the routine 1000 proceeds to operation 1012, where a second transport medium (e.g. lower frequency RF signal, fiber optic cable, or traditional copper cable) selected for transmission.

From operation 1010 or operation 1012, the routine 1000 proceeds to operation 1014, where the selected RF signal is transmitted towards the antenna at the remote site. The RF signal may be transmitted through a millimeter wave antenna or a microwave antenna based on the frequency of the selected RF signal. If the RF signal has a frequency of more than 30 GHz, the RF signal is transmitted via the millimeter wave flat panel antenna 202. However, if the RF signal is a microwave frequency, the selected RF signal is transmitted via the microwave antenna 614. From operation 1014, the routine 1000 proceeds to operation 1002, described above.

Figure 11:
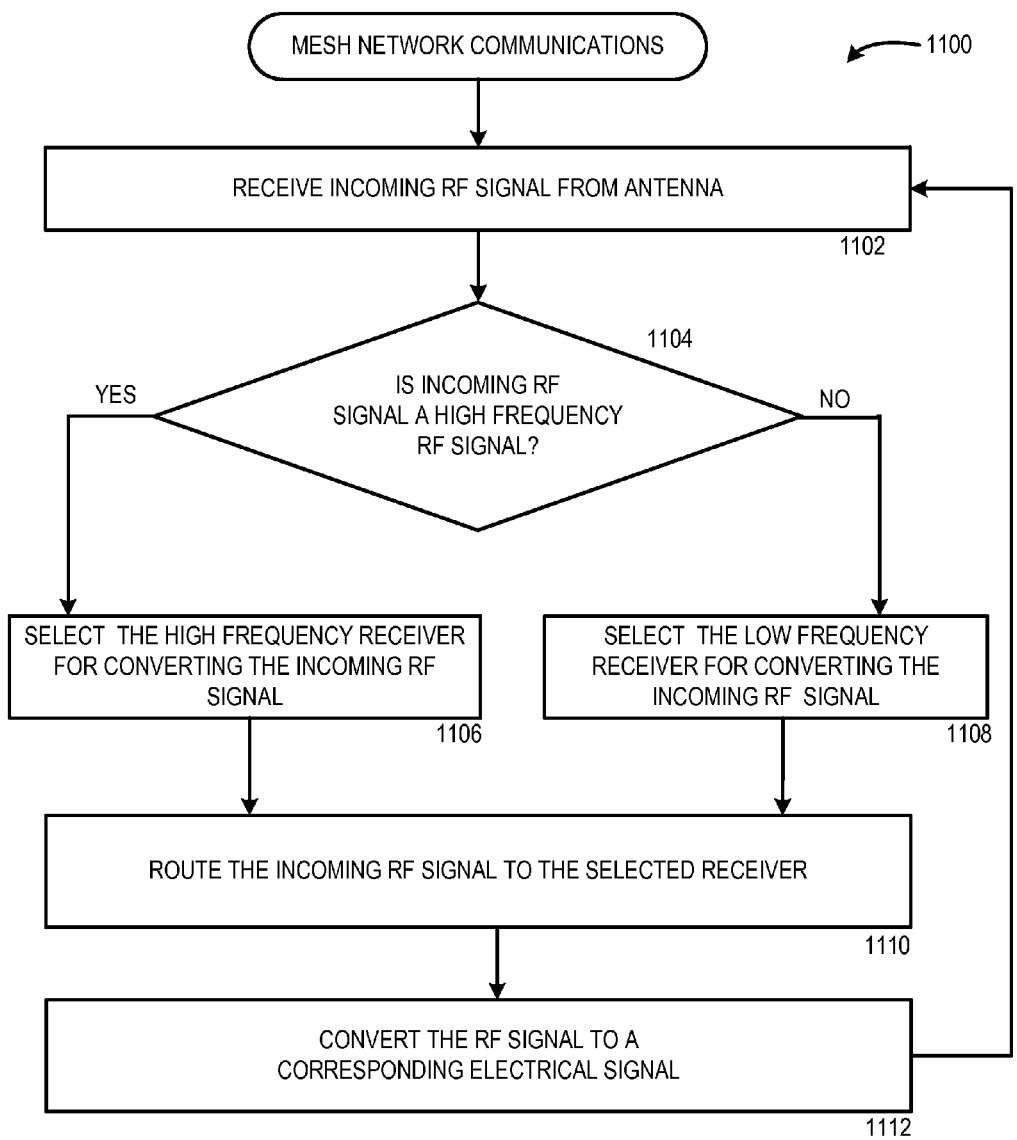
FIG. 11 is a logical flow diagram showing aspects of one illustrative process disclosed herein for data communication within the mesh network shown in FIG. 7, in accordance with some embodiments.

FIG. 11 is a logical flow diagram illustrating a process of data transmission in a mesh network such as the mesh network described above with regard to FIG. 7, according to some embodiments. In particular, a routine 1100 for handling an incoming RF signal at a base station in a mesh network begins at operation 1102, where data is received by the radio system 600, 700, or 800 of a particular base station. The data may be received from various devices communicating with the base station or via other base stations that are relaying data through the base station. The data may be received by either a microwave antenna, a millimeter wave antenna, or a dual band antenna configured to receive both millimeter wave frequencies and microwave frequencies.

From operation 1102, the routine 1100 proceeds to operation 1104, where it is determined whether the incoming RF signal is a millimeter wave frequency. If, at operation 1104, it is determined that the incoming RF signal is a millimeter wave frequency, the routine 1100 proceeds to operation 1106, where the quadplexer 612 selects the high frequency receiver for converting the RF signal to a corresponding electrical signal.

However, if at operation 1104, it is determined that the incoming RF signal is not a millimeter wave frequency, the routine 1100 proceeds to operation 1108, where the quadplexer 612 selects the low frequency receiver for converting the RF signal to a corresponding electrical signal. From operation 1106 and operation 1108, the routine proceeds to 1110, where the quadplexer 612 routes the incoming RF signal to the selected receiver. From operation 1112, the selected receiver converts the incoming RF signal to a corresponding electrical signal. From operation 1112, the routine continues back to operation 1102.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A multi-sector antenna system, wherein two local antennas are disposed at a single local site, the multi-sector antenna system comprising:
   a first of the two local antennas configured to face a first remote antenna in a first direction and to receive a first set of incoming radio frequency (RF) signals from the first remote antenna;
   a processing module communicatively coupled to the first local antenna, the processing module configured to convert the first set of incoming RF signals to a first set of outgoing RF signals;
   a second of the two local antennas coupled to the processing module and configured to face a second remote antenna in a second direction, wherein the second direction is different from the first direction, and wherein the second local antenna is configured to transmit the first set of outgoing RF signals to the second remote antenna; and
   an antenna direction control assembly comprising a mounting structure and first and second actuation assemblies rotatably secured to the mounting structure, each of the first and second actuation assemblies are configured to rotate a respective first or second local antenna about an axis of the mounting structure, each of the first and second actuation assemblies comprising a rotatable mounting member and a stationary antenna mounting member, the rotatable mounting member comprising at least one electrical connection band electrically coupled to the processing module via one or more cables, the one or more cables coupled to the electrical connection band via an electrical contact component configured to remain in contact with the electrical connection band while the electrical connection band rotates relative to the electrical contact component, such that the one or more cables do not rotate, wherein the mounting structure is configured so that the direction in which the one of the first or second local antennas faces may be selectively changed relative to the direction in which the other of the first or second local antennas faces.

2. The multi-sector antenna system of claim 1, wherein the processing module is further configured to:

receive the first set of incoming RF signals from the first local antenna;

convert the first set of incoming RF signals to a first set of electrical signals;

modulate the first set of electrical signals on a baseband signal; and convert the modulated baseband signal to the first set of outgoing RF signals.

3. The multi-sector antenna system of claim 2, wherein modulating the electrical signals on the baseband signal comprises:

modulating the corresponding electrical signals on a baseband signal to a higher frequency RF signal and a lower frequency RF signal; and selecting one of the higher frequency baseband signal and the lower frequency baseband signal to be the modulated baseband signal.

4. The multi-sector antenna system of claim 1, wherein the first set of incoming RF signals and the first set of outgoing RF signals are millimeter wave frequencies.

5. The multi-sector antenna system of claim 4, wherein each of the first local antenna and the second local antenna is a millimeter wave flat panel antenna and is configured to transmit and receive RF signals at frequencies in the range of about 57 GHz to 86 GHz.

6. The multi-sector antenna system of claim 5, further comprising a third local antenna configured to transmit the first set of outgoing RF signals at a data transmittal rate of only less than about 155 million bits per second.

7. The multi-sector antenna system of claim 5 further comprising a third local antenna configured to transmit the first set of outgoing RF signals, wherein the processing module is further configured to discern a signal to noise ratio of the first set of incoming RF signals and to direct the first set of outgoing RF signals to either the second local antenna or the third local antenna based upon whether the discerned signal to noise ratio is less than a desired signal to noise ratio.

8. The multi-sector antenna system of claim 7 wherein the third local antenna is a configured to transmit the first set of outgoing RF signals at frequencies in the range of about 2.4 GHz to 23 GHz.

9. The multi-sector antenna system of claim 7 wherein the third local antenna is configured to transmit RF signals at a data transmittal rate of only less than about 155 million bits per second.

10. The multi-sector antenna system of claim 1, wherein the second local antenna is further configured to receive a second set of incoming RF signals; and wherein the processing module is further configured to receive the second set of incoming RF signals from the second local antenna, and convert the second set of incoming RF signals to a second set of outgoing RF signals; and wherein the first local antenna is further configured to transmit the second set of outgoing RF signals.

11. The multi-sector antenna system of claim 10, wherein the processing module is further configured to:

convert the second set of incoming RF signals to a second set of electrical signals;

modulate the second set of electrical signals on a second baseband signal;

convert the second modulated baseband signal to the second set of outgoing RF signals.

12. The multi-sector antenna system of claim 1, wherein the mounting structure is cylindrical and the rotatable mounting member is configured to mount concentrically about the outer surface of the mounting structure.

13. An antenna direction control assembly for a multi-sector antenna system having two local antennas disposed at a single local site, the antenna direction control assembly comprising:

a) a mounting structure; and b) a first actuation assembly rotatably secured to the mounting structure, the first actuation assembly configured to rotate a first local antenna about an axis of the mounting structure, the first actuation assembly comprising a first rotatable mounting member and a first stationary antenna mounting member, the first rotatable mounting member comprising at least one electrical connection band electrically coupled to a processing module which is coupled to the first local antenna, the electrical connection band being coupled to the processing module via one or more cables, the one or more cables coupled to the electrical connection band via an electrical contact component configured to remain in contact with the electrical connection band while the electrical connection band rotates relative to the electrical component, such that the one or more cables do not.

14. The multi-sector antenna system of claim 13, wherein the mounting structure is further configured to mount a second local antenna, and wherein the mounting structure comprises a second actuation assembly rotatably secured to the mounting structure, the second actuation assembly configured to rotate the second local antenna about the axis of the mounting structure, the second actuation assembly comprising a second rotatable mounting member and a second stationary antenna mounting member, the second rotatable mounting member comprising at least one second electrical connection band electrically coupled to the processing module which is coupled to the second local antenna.

15. The antenna direction control assembly of claim 13 wherein the first actuation assembly is configured to rotate the first local antenna+/−45 degrees about a y axis.

16. The antenna direction control assembly of claim 13, wherein the mounting structure includes one or more cable pathways extending its longitudinal length, the cable pathways adapted to pass the one or more electrical cables therethrough.

17. The antenna direction control assembly of claim 13, wherein the electrical contact component is a carbon brush.

18. The multi-sector antenna system of claim 13, wherein the mounting structure is cylindrical and the first rotatable mounting member is configured to mount concentrically about the outer surface of the mounting structure.

19. A method of wirelessly receiving and transmitting data within a wireless network communications system, the method comprising:
  providing a multi sector antenna having a first local receiving antenna and a first local transmitting antenna, wherein the first local receiving antenna is configured to receive a first incoming radio frequency (RF) signal, and the first local transmitting antenna is configured to transmit a selected outgoing RF signal to a second remote receiving antenna at a first remote site located remotely from the multi sector antenna, the multi sector antenna including an antenna direction control assembly comprising a mounting structure and first and second actuation assemblies rotatably secured to the mounting structure, each of the first and second actuation assemblies configured to rotate a respective first or second local antenna about an axis of the mounting structure, each of the first and second actuation assemblies comprising a rotatable mounting member and a stationary antenna mounting member, the rotatable mounting member comprising at least one electrical connection band electrically coupled to a processing module via one or more cables, the one or more cables coupled to the electrical connection band via an electrical contact component configured to remain in contact with the electrical connection band while the electrical connection band rotates relative to the electrical contact component, such that the one or more cables do not rotate;
  modulating the received first incoming RF signal on a first baseband signal and a second baseband signal;
  converting the first baseband signal to a first outgoing RF signal;
  converting the second baseband signal to a second outgoing RF signal, the first outgoing RF signal having a higher frequency than the second outgoing RF signal;
  determining if the first outgoing RF signal is capable of being received by the second remote receiving antenna, wherein the determination is made by comparing a measured signal to noise ratio of the first incoming RF signal to a predetermined signal to noise ratio threshold;
  selecting the first outgoing RF signal for transmission if the measured signal to noise ratio of the first incoming RF signal is greater than the predetermined signal to noise ratio threshold;
  selecting the second outgoing RF signal for transmission if the measured signal to noise ratio of the first incoming RF signal is less than the predetermined signal to noise ratio threshold; and
  transmitting, via the first local transmitting antenna, the selected outgoing RF signal to the second remote receiving antenna at the first remote site.

20. The method of claim 19, wherein the higher frequency outgoing RF signal has a frequency in the range of about 57 GHz to 86 GHz and the lower frequency outgoing RF signal has a frequency in the range of about 2.4 GHz to 23 GHz.

21. The method of claim 19, further comprising:
  facing a second local receiving antenna in a direction of a second remote transmitting antenna at a second remote site;
  receiving, via the second local receiving antenna, a second incoming RF signal from the second remote transmitting antenna; and
  converting the second incoming RF signal to a corresponding incoming baseband signal comprising data.

22. The method of claim 21, wherein facing the second local receiving antenna in the direction of the second remote transmitting antenna comprises:
  sending a control signal to the respective actuating assembly coupled to the second local receiving antenna;
  causing the second local receiving antenna to rotate along at least one of an x or y axis of the mounting structure; and
  stopping the rotation of the second local receiving antenna at a desired location where the second local receiving antenna is capable of receiving the second incoming RF signal.

23. The multi-sector antenna system of claim 19 wherein each actuation assembly is configured to rotate its respective local antenna +/−45 degrees about a y axis.

24. The method of claim 19, wherein the measured signal to noise ratio is determined by measuring the bit error rate of links.

25. The method of claim 19, wherein the higher frequency of the first outgoing RF signal has a data transmission rate of at least 1 billion bits per second and the second outgoing RF signal has a capability of transmitting data at a rate of no more than 155 million bits per second.

* * * * *